Oct. 11, 1932.  E. R. GURNEY  1,882,319
ENGINE HOOD CONSTRUCTION
Filed June 26, 1931  2 Sheets-Sheet 1

INVENTOR
Erving R. Gurney,
BY Redding, Greely, O'Shea & Campbell
HIS ATTORNEYS

Oct. 11, 1932.   E. R. GURNEY   1,882,319
ENGINE HOOD CONSTRUCTION
Filed June 26, 1931   2 Sheets-Sheet 2
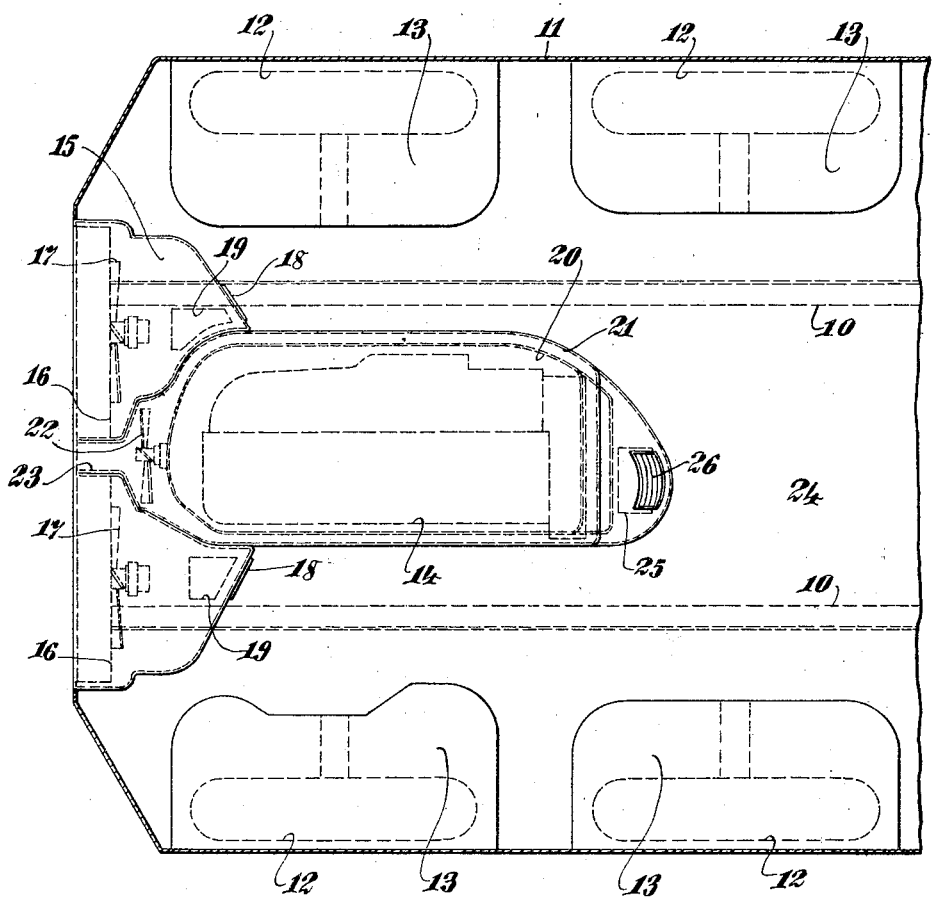
INVENTOR
Erving R. Gurney,
BY
Redding, Greeley, O'Shea + Campbell
HIS ATTORNEYS Patented Oct. 11, 1932

1,882,319

UNITED STATES PATENT OFFICE

ERVING R. GURNEY, OF ALLENTOWN, PENNSYLVANIA, ASSIGNOR TO INTERNATIONAL MOTOR COMPANY, OF NEW YORK, N. Y., A CORPORATION OF DELAWARE

ENGINE HOOD CONSTRUCTION

Application filed June 26, 1931. Serial No. 546,930.

The present invention relates to cooling systems for motor vehicles and embodies, more specifically, a cooling system wherein the engine radiators are cooled by suitable air currents and the engine compartment itself is cooled and ventilated by a separate air current to regulate the heating of the interior of the vehicle by such engine heat.

In certain forms of vehicles the engine is housed directly within the vehicle body as, for example, in the so-called metropolitan type of buses, wherein the body resembles the outline of a street car. It will be readily apparent that the heat radiated by the engine in the summer time is quite a disagreeable factor in the operation of these types of vehicles and the present invention has for an object the provision of a body of this type, wherein the radiation of heat from the engine to the body is effectively regulated.

A further object of the invention is to provide a device of the above character including a cooling and ventilating system for the engine which embodies a double walled housing between the walls of which a flow of air is directed to prevent excessive heat from being radiated into the interior of the body.

A further object of the invention is to provide suitable means for directing the warm air from the space between the walls of the engine compartment and the radiator housings into the vehicle body or below the same as convenience requires.

Further objects, not specifically enumerated above, will be apparent as the invention is described in greater detail in connection with the accompanying drawings, wherein:

Figure 2 is a view in section, taken on line 2—2 of Figure 1, and looking in the direction of the arrows.

Figure 1:
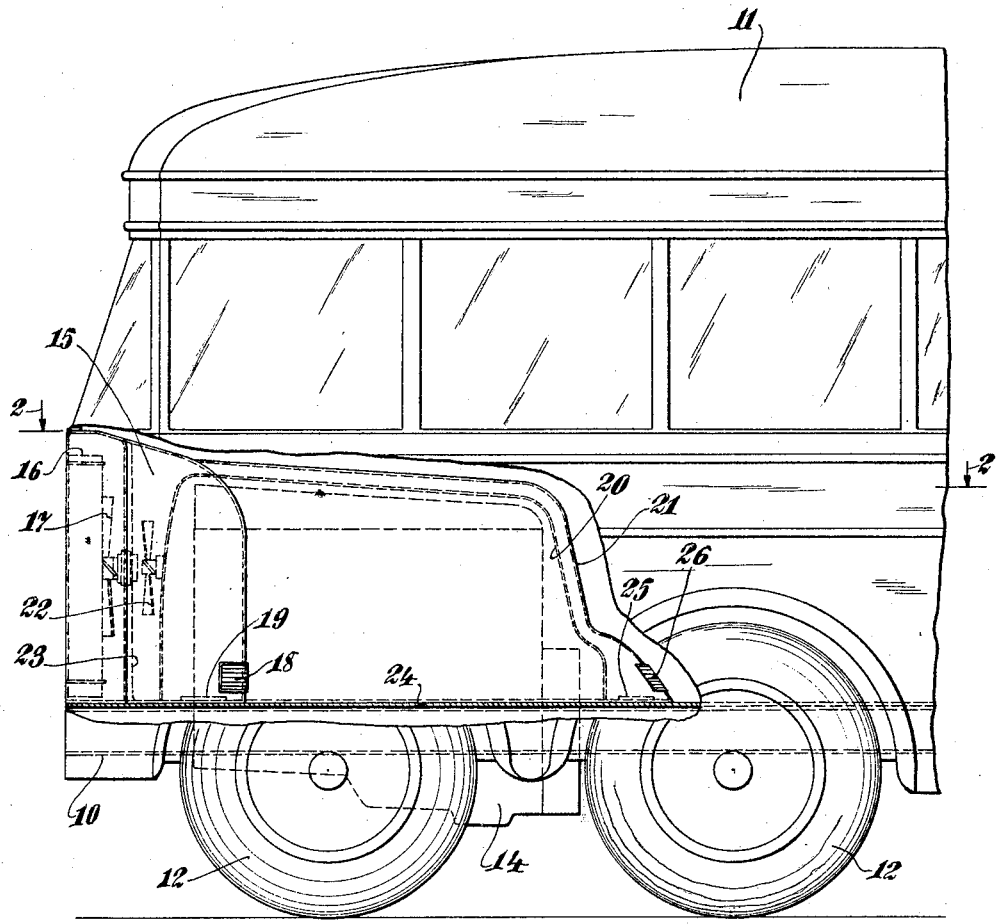
Figure 1 is a view in side elevation, partly broken away and in section, showing a vehicle constructed with an engine compartment and ventilating means therefor in accordance with the present invention.

Referring to the above drawings a vehicle is shown as including frame members 10 upon which a body 11 is mounted. The specific body and frame construction forms no part of the present invention and further reference thereto will not be made herein except to identify the wheels 12 which are received within suitable wheel housings 13 formed in the body.

The engine 14, indicated in dotted lines in Figures 1 and 2, is mounted upon the body or frame of the vehicle and a suitable power transmitting means is provided between the engine and driving wheels. This specific mechanism forms no part of the present invention inasmuch as any of the standard drives may be utilized.

Forwardly of the body, suitable radiator housings 15 are formed, radiators 16 being mounted therein. Fans 17 are provided rearwardly of the radiators and are driven by the engine in any of the standard fashions. In one form of the invention two spaced radiators 16 are provided upon opposite sides of the body forwardly thereof. The housings 15 are suitably formed with louvers or ventilators 18 through which air may flow from the interior of the housings to the body of the vehicle. Additional louvers or ventilators 19 are provided in the floor or bottom of the housings to permit the air to be directed under the vehicle and thus not be heated by such air.

The engine is mounted within a housing 20 which is spaced at all points within an outer housing 21 in order that a space may be provided entirely about the interior housing 20. A frontal fan 22 is driven by the engine and the space between the inner and outer housings extends forwardly, the outer housing 21 forming a frontal opening 23 through which air is drawn by means of the fan 22. This air passes rearwardly between the housings and is discharged through the floor 24 of the vehicle by means of a suitable register or louvers 25. A register or louvers 26 are provided in the rear wall of the outer housing in order that some of the heated air from the space between the housings may be introduced into the vehicle body to effect the heating thereof in the winter time.

It will thus be seen that the heat which is normally radiated from the engine will be carried away by the flow of air between the inner and outer housings and directed beneath the vehicle to prevent the undue heating of the interior thereof. At the same time, a convenient means is afforded for directing such heated air into the vehicle if desired, and the resulting operation of the vehicle is thus improved materially.

While the invention has been described with specific reference to the accompanying drawings, it is not to be limited, save as defined in the appended claims.

I claim as my invention:

1. A vehicle having an engine, fluid cooling means including a radiator, means to circulate air through the radiator, a double walled housing for the engine, the space between the walls being completely closed from the engine, and means independent of the circulating means to circulate air between the walls of the housing without passing through the radiator.

2. A vehicle having an engine, a plurality of radiators at the front of the engine, fans for directing cooling air through the radiators, housings for the radiators and fans, a double walled housing for the engine, the space between the walls communicating with the front of the vehicle between the first housings and the exterior of the vehicle rearwardly of the engine, and a frontal fan for directing air between the spaced walls.

3. A vehicle having an engine, a plurality of radiators at the front of the engine, fans for directing cooling air through the radiators, housings for the radiators and fans, a double walled housing for the engine, the space between the walls communicating with the front of the vehicle between the first housings and the exterior of the vehicle rearwardly of the engine, a frontal fan for directing air between the spaced walls, and means to direct air from all of the housings into the interior of the vehicle.

This specification signed this 22nd day of June, A. D. 1931.

ERVING R. GURNEY.